United States Patent [19]

Rülke

[11] Patent Number: 4,623,060

[45] Date of Patent: Nov. 18, 1986

[54] CLEANING APPARATUS FOR CLEANING THE GLASS LINING OF PASSENGER CONVEYING MEANS

[75] Inventor: Gerhart Rülke, Vienna, Austria

[73] Assignee: Inventio AG, Hergiswil, Switzerland

[21] Appl. No.: 679,475

[22] Filed: Dec. 7, 1984

[30] Foreign Application Priority Data

Dec. 23, 1983 [CH] Switzerland ......................... 6908/83

[51] Int. Cl.⁴ ............................................. B65G 45/00

[52] U.S. Cl. .................................... 198/495; 198/498; 198/335; 15/50 R; 15/98

[58] Field of Search ............... 198/494, 495, 498, 335; 15/50 R, 50 C, 98

[56] References Cited

U.S. PATENT DOCUMENTS

| | | | |
|---|---|---|---|
| 2,167,296 | 7/1939 | Farmer | 15/98 |
| 2,634,850 | 4/1953 | Hansen | 198/494 |
| 3,080,592 | 3/1963 | Hassage | 15/98 |
| 3,298,052 | 1/1967 | Wolfe | 15/50 C |
| 3,999,242 | 12/1976 | Maruyama et al. | 15/50 R |
| 4,163,301 | 8/1979 | Griffin | 15/50 R |

FOREIGN PATENT DOCUMENTS

| | | | |
|---|---|---|---|
| 146804 | 6/1952 | Australia | 198/495 |
| 275310 | 6/1964 | Australia | 198/335 |
| 1298355 | 6/1969 | Fed. Rep. of Germany . | |
| 1628595 | 8/1970 | Fed. Rep. of Germany . | |

*Primary Examiner*—Joseph E. Valenza
*Attorney, Agent, or Firm*—Werner W. Kleeman

[57] ABSTRACT

Using the cleaning apparatus there can be cleaned the inner surfaces of a glass lining which laterally covers the support structure of an escalator. A cleaning carriage is guided parallel to the top flange and the bottom flange of the support structure and is reciprocated by a cable drive in the direction of the escalator inclination between the support structure and the glass lining. A cleaning liquid distributor uniformly distributes cleaning liquid at the inner surfaces of the glass lining. A wiper blade is mounted at the cleaning carriage and presses against the inner surface of the glass lining. During the reciprocation of the cleaning carriage the wiper blade wipingly moves along the glass lining. The excess cleaning liquid and the cleaning liquid which accumulates during the wiping of the glass lining is received and drained by a lower one of guide rails at which the cleaning carriage is guided.

12 Claims, 4 Drawing Figures

CLEANING APPARATUS FOR CLEANING THE GLASS LINING OF PASSENGER CONVEYING MEANS

BACKGROUND OF THE INVENTION

The present invention relates to a new and improved cleaning apparatus for cleaning a glass lining or cover which laterally covers the support structure of a passenger conveying means like an escalator or a passenger conveying belt or moving walkway.

For architectural reasons, in recent times glass linings not only are contemplated and constructed for the balustrades or hand rail structures, but increasingly are also contemplated and partially also constructed for laterally covering the support structure of passenger conveying means, such as escalators. A main problem of such construction exists with respect to cleaning in particular the inner surfaces of the glass lining. It has been found that specifically these inner surfaces tend to be rather more strongly soiled than the outer surfaces. The dust and dirt which is wiped off the shoes of passengers onto the surfaces of the tread-plates on the steps of an escalator at least partially arrives at the interior of the escalator. Air circulation is generated in the interior of the escalator by the circulating conveyor and, as a result thereof, dust particles are also deposited at the inner lateral surfaces of the glass lining. For this reason these surfaces must be periodically cleaned.

Hitherto this problem has been solved for the small number of passenger conveying means, like escalators, in which the support structures are covered by glass linings or covers, by mounting the individual glass plates such as to be dismountable or to be folded upwardly or downwardly for the cleaning operation. It is a great disadvantage of this construction that the access to the inclined side members of an escalator which interconnects two floors is very difficult. Such access is especially rendered nearly impossible without any additional scaffolding when a number of escalators are arranged on top of each other and large floor gaps are provided in the regions of the floors. When two escalators are crosswisely arranged in juxtaposition, the access to the central glass plates which are directly confronting each other is still more difficult and the upward or downward folding of the glass plates for cleaning their inner surfaces is totally impossible. Additionally, there prevail great risks of accidents to which the cleaning personnel is exposed during the cleaning operations, and last but not least, there is also the increased danger of glass breakage.

SUMMARY OF THE INVENTION

Therefore, with the foregoing in mind it is a primary object of the present invention to provide a new and improved cleaning apparatus for cleaning the surfaces of a glass lining or cover laterally covering the support structure of passenger conveying means, like an escalator or a conveying belt or moving walkway, and which cleaning apparatus can be used with any existing arrangement of passenger conveying means.

Another and more specific object of the present invention is directed to the provision of a new and improved cleaning apparatus for a glass lining or cover laterally covering the support structure of passenger conveying means, such as an escalator or a conveyor belt or moving walkway, and which cleaning apparatus not require that the glass plates of the glass lining be removed or folded upwardly or downwardly for the cleaning operation.

Still a further significant object of the present invention is directed to a new and improved cleaning apparatus for a glass lining or cover of the support structure of passenger conveying means, like an escalator or a conveyor belt or moving walkway, and which enables the cleaning operation on the surfaces of the glass lining to be performed practically without any danger of accidents to the cleaning personnel.

Now in order to implement these and still further objects of the invention, which will become more readily apparent as the description proceeds, the cleaning apparatus of the present development is manifested by the features that, a cleaning carriage is arranged at the glass lining or cover and is guided at related guide rails which are arranged substantially parallel to the top flange or chord and to the bottom flange or chord of the support structure. The cleaning carriage is reciprocated by cable drive means. A wiper blade which wipes or scrapes at least across the height of the glass lining or cover and which extends normally to the guide rails is mounted at the cleaning carriage. Cleaning liquid distributing means are provided which distribute cleaning liquid over the glass lining or cover.

The advantages achieved by the invention are essentially that the surfaces of the lateral glass lining or cover of the support structure for the passenger conveying means, like an escalator or a conveyor belt or moving walkway, can be cleaned without there being required for cleaning personnel access to these surfaces from the inside or from the outside of the passenger conveying means. Also, the cleaning operation can be performed by a single operator at any time, if necessary, even during the operation of the passenger conveying means. It is a further advantage that the danger of accidents to cleaning personnel and the danger of glass breakage during the cleaning operation are completely eliminated. Furthermore, any arrangement of the passenger conveying means at the construction site is possible without having to particularly consider the inventive cleaning apparatus which may possibly be mounted at the passenger conveying means.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
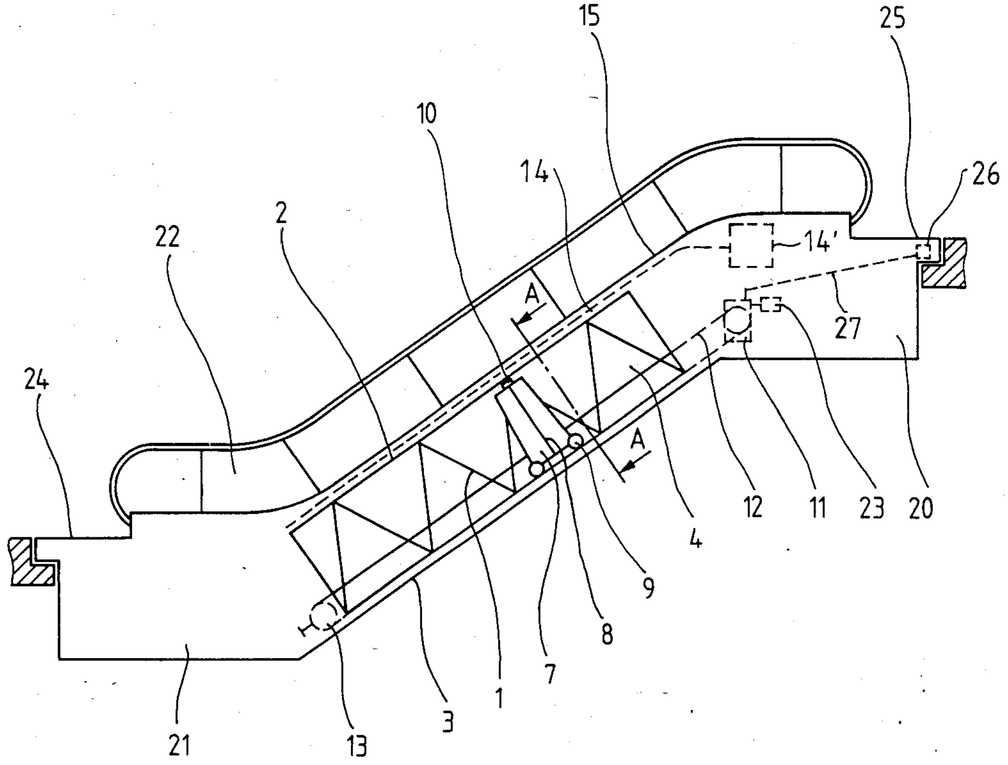
FIG. 1 is a side view of an escalator provided with the cleaning apparatus according to the invention.

Describing now the drawings it is to be understood that only enough of the construction of the cleaning apparatus has been shown as needed for those skilled in the art to readily understood the underlying principles and concepts of the present development while simplifying the showing of the drawings. Turning attention now specifically to FIG. 1, there has been schematically illustrated therein a passenger conveying means in the form of an escalator, but which also can take any other suitable form or construction of passenger conveying means like, for example, a passenger conveying belt or moving walkway. The support structure of the escalator is designated by the reference character 1. This support structure 1 comprises a top flange or chord 2 and a bottom or base flange or chord 3. The inclined portion of the support structure 1 is laterally covered by a glass lining or cover 4, whereas the horizonal top portion 20 and the horizontal base portion 21 are covered by steel sheets. A balustrade or handrail structure 22 is mounted above the support structure 1. The escalator comprises a lower entrance or stepping plate 24 and an upper entrance or stepping plate 25.

A cleaning carriage 7 is arranged between the support structure 1 and the glass lining 4. The cleaning carriage 7 can be upwardly and downwardly displaced at an inclination by means of running or travel rollers 9 and a support roll 10 at related guide rails 5, 6. The guide rail 5 is arranged in parallel relationship at the top flange or chord 2 and the guide rail 6 is arranged in parallel relationship at the bottom or base flange or chord 3 of the support structure 1. The cleaning carriage 7 is reciprocated or displaced by cable drive means 11 which contain an electric drive motor 23 and an endless traction cable 12. The traction cable 12 is returned at the lower end of the escalator by means of a tensioning roll 13. A wiper blade 8, preferably formed of one piece, is mounted at the cleaning carriage 7 and extends normally to the guide rails 5, 6.

Figure 2:
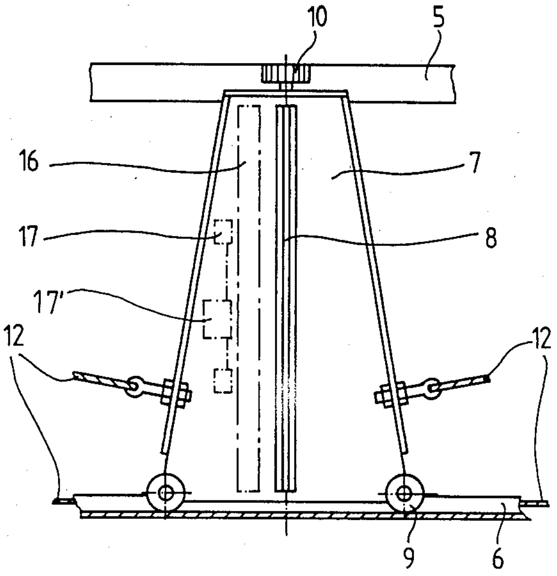
FIG. 2 is a front elevational view of the cleaning carriage in the cleaning apparatus as shown in FIG. 1.

The cleaning carriage 7 is more distinctly illustrated at a somewhat larger scale in the front elevational view of FIG. 2. The cleaning carriage 7 runs along the guide rail 6 of a continuously U-shaped cross-section by means of the lower running or travel rollers 9 and is supported at the upper guide rail 5 by means of the support roll 10. The wiper blade 8 is directed towards the glass lining or cover 4 or the glass plates forming the glass lining or cover 4 and is fixedly adjustably mounted at the cleaning carriage 7.

In a further embodiment illustrated by dash-dotted lines in FIG. 2 at least one sponge-like ledge 16 or the like is arranged parallel to the wiper blade 8 at the cleaning carriage 7 and this sponge-like ledge 16 can be soaked with a suitable cleaning liquid or cleanser and thus uniformly wets the glass lining 4. There can be additionally provided spray nozzles 17. The reciprocating movements of the cleaning carriage 7 are effected, as stated hereinabove, by means of the traction cable 12 and the cable drive means 11.

Figure 3:
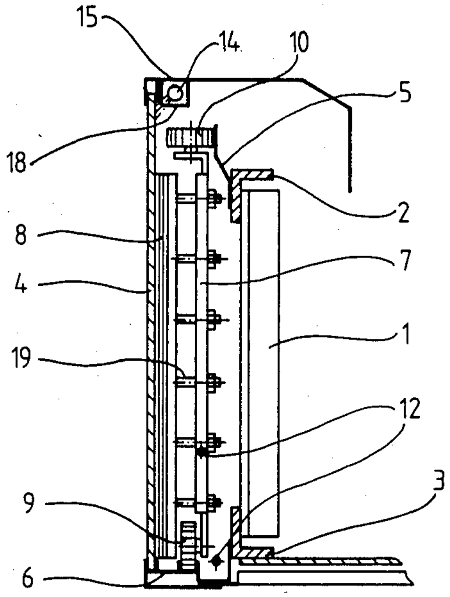
FIG. 3 is a section along the line A—A in FIG. 1 through a side member of the support structure for the escalator shown in FIG. 1.
Figure 4:
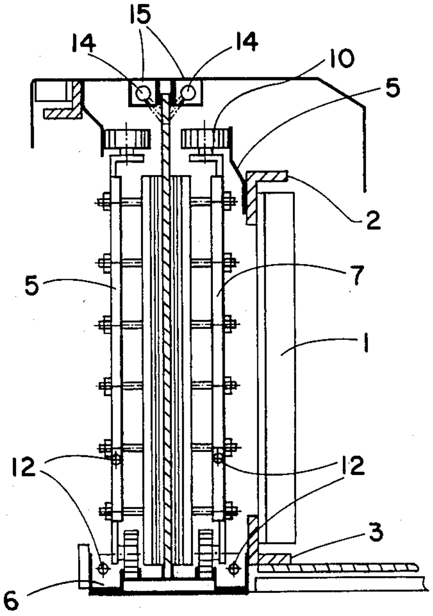
FIG. 4 is a section along the line A—A in FIG. 1 but showing two cleaning appartuses according to the invention.

A side view of the cleaning carriage 7 which runs between the glass lining 4 and the support structure 1 is shown in FIG. 3. The guide rail 6 is mounted to the bottom or base flange or chord 3 of the support structure 1 and the running or travel rollers 9 of the cleaning carriage 7 roll along the guide rail 6. The guide rail 5 at which the support roll 10 is supported is mounted at the top flange or chord 2 of the support structure 1. A support profile 18 is provided above the top flange or chord 2 over the entire predetermined length of the glass lining 4. The support profile 18 contains openings or apertures and receives a cleaning liquid hose 14 of cleaning liquid distributing means 14, 14' which also comprise a pump 14', see FIG. 1. A support covering profile 15 covers the support profile 18 and the cleaning liquid hose 14 and simultaneously serves as an upper retainer for the glass lining 4. The wiper blade 8 engages the inside of the glass lining 4 and is adjustably mounted at the cleaning carriage 7 by means of screw bolts 19 or equivalent structure. In a modified embodiment which is not particularly illustrated the wiper blade 8 comprises at least one member and is resiliently supported at the cleaning carriage 7 by suitable spring means, so that it can be resiliently pressed against the glass lining 4 during a cleaning operation. As stated hereinbefore, the cleaning carriage 7 is drivingly connected to the cable drive means 11 by means of the traction cable 12.

The cleaning apparatus as described hereinbefore operates as follows:

In its rest or inoperative position the cleaning carriage 7 of the cleaning apparatus is located in the upper region of the escalator. In this position the cleaning carriage 7 is parked behind the steel sheet covering the horizontal top portion 20 and is invisible for the passengers. Only the upper strand or run of the endless traction cable 12 of the cleaning apparatus is visible through the glass lining or cover 4. The cleaning apparatus is utilized when the inside of the glass lining 4 is strongly soiled. By means of the cleaning liquid hose 14 which continuously extends above the top edge of the support structure 1, cleaning liquid is sprayed on and distributed over the inner surface of the glass lining 4 by briefly operating the pump 14' as schematically illustrated in FIG. 1. Depending on the extent of soiling this operation can also be repeated. The run-off cleaning liquid is received by the lower guide rail 6 which is formed in a substantially U-shape and is conducted to the lower portion of the escalator and into a waste liquid conduit. Simultaneously the cleaning carriage 7 is pulled by the traction cable 12 which is moved by the cable drive means 11 and thus is displaced towards the lower end of the escalator. During this operation the glass lining 4 is wiped or scraped across its entire height by the wiper blade 8 which is pressed against the inner surface of the glass lining 4. The cleaning carriage 7 is guided by the running or travel rollers 9 and the support roll 10 at the guide rails 6 and 5, respectively, in such a manner that the wiper blade 8 is moved at constant pressure across the entire surface of the glass lining 4. The liquid which accumulates during the scraping operation on the glass plates of the glass lining or cover 4 is also received and drained by the lower guide rail 6. The cleaning carriage 7 can be multiply moved along the glass lining 4.

It is readily conceivable that a similar cleaning apparatus or cleaning carriage can also be arranged at the outer surface of the glass lining 4 and that such a similar cleaning apparatus or cleaning carriage can be additionally utilized for cleaning the outer surface of the glass lining 4.

Instead of the cleaning liquid hose 14 which extends over the entire length of the glass lining 4 or in addition thereto, cleaning liquid distributing means 17, 17' can also be arranged at the cleaning carriage 7. Such cleaning liquid distributing means 17, 17' contain one or more lines and at least one spray nozzle 17 operated by a pump 17' as shown in dash-dotted lines in FIG. 2. The pump 17' may be arranged within a not particularly illustrated container for cleaning liquid. The spray nozzles 17 are arranged at least on one side of the wiper blade 8, but preferably are arranged in such a manner that during reciprocation of the cleaning carriage 7 cleaning liquid is sprayed upon the surface of the glass lining 4 in front of the wiper blade 8.

It is also feasible that instead of the cleaning liquid hose 14 a series of spray nozzles can be arranged over the entire length of the glass lining 4.

Instead of the support roll 10 the cleaning carriage 7 can be slidingly supported. It is also possible to only equip the cleaning carriage 7 solely with sliding supports instead of the running or travel rollers 9 and the support roll 10.

Instead of the electric drive motor 23 of the cable drive means 11 there can also be provided manually operable drive means 26, 27 which are schematically illustrated by dotted lines in FIG. 1. The manually operable drive means 26, 27 comprise mechanical deflection or transmission means 27 enabling the operator to displace the cleaning carriage 7 by means of a plug-in crank handle 26 away from the region of the upper entrance or stepping plate 25 of the escalator.

While there are shown and described present preferred embodiments of the invention, it is to be distinctly understood that the invention is not limited thereto, but may be otherwise variously embodied and practiced within the scope of the following claims. Accordingly,

What I claim is:

1. A cleaning apparatus for cleaning a glass lining of passenger conveying means, comprising:
- a support structure for a passenger conveying means comprising a top flange and a base flange;
- said support structure being laterally covered in laterally spaced relationship by the glass lining;
- the glass lining having a predetermined height;
- related guide rails mounted at said top flange and said base flange of said support structure in a substantially parallel relationship;
- a cleaning carriage guided between said support structure and the glass lining by said guide rails;
- cable drive means operatively connected to said cleaning carriage for reciprocatingly driving the same along said guide rails;
- a wiper blade mounted at said cleaning carriage and extending normally to said guide rails;
- said wiper blade wiping the glass lining across at least said predetermined height thereof while said cleaning carriage is reciprocatingly driven along said guide rails; and
- cleaning liquid distributing means for distributing a cleaning liquid over the glass lining.

2. The cleaning apparatus as defined in claim 1, further including:
- a support covering profile;
- said glass lining having a predetermined length;
- said cleaning liquid distributing means containing a cleaning liquid distributing hose extending over the entire predetermined length of said glass lining above said top flange of said support structure and further containing a pump operatively connected to said cleaning liquid distributing hose; and
- said support covering profile covering said cleaning liquid distributing hose.

3. The cleaning apparatus as defined in claim 1, wherein:
- said cleaning liquid distributing means are arranged at said cleaning carriage; and
- said cleaning liquid distributing means comprising a pump and at least one spray nozzle operatively connected to said pump and arranged on at least one side of said wiper blade mounted at said cleaning carriage.

4. The cleaning apparatus as defined in claim 1, wherein:
- said guide rail arranged at said base flange of said support structure and guiding said cleaning carriage is formed with a continuous substantially U-shaped cross-section and receives run-off cleaning liquid.

5. The cleaning apparatus as defined in claim 1, further including:
- means for fixedly adjustably arranging said wiper blade at the cleaning carriage.

6. The cleaning apparatus as defined in claim 1, wherein:
- said wiper blade is formed of at least one piece; and
- said wiper blade being resiliently pressed against said glass lining.

7. The cleaning apparatus as defined in claim 1, wherein:
- said cleaning liquid distributing means comprise at least one sponge-like ledge;
- said at least one sponge-like ledge being arranged substantially parallel to said wiper blade at said cleaning carriage; and
- said at least one sponge-like ledge being soakable with cleaning liquid and uniformly wetting said glass lining in its soaked condition.

8. The cleaning apparatus as defined in claim 1, wherein:
- said cable drive means for reciprocatingly driving said cleaning carriage comprise manually operated drive means; and
- said manually operable drive means contain a plug-in crank handle.

9. The cleaning apparatus as defined in claim 8, wherein:
- the passenger conveying means comprise a stepping plate; and
- said plug-in crank handle being connectable to said manually operable drive means in the region of said stepping plate.

10. The cleaning apparatus as defined in claim 1, wherein:
- said glass lining defining an outer side; and
- a further cleaning carriage being arranged on said outer side of the glass lining.

11. The cleaning apparatus as defined in claim 1, wherein:
- the passenger conveying means constitute an escalator.

12. A cleaning apparatus for cleaning a glass lining of passenger conveying means, comprising:
- a support structure for a passenger conveying means comprising a top flange and a base flange;
- said support structure being laterally covered in laterally spaced relationship by the glass lining;
- related guide rails mounted at said top flange and said base flange of said support structure in a substantially parallel relationship;

a cleaning carriage between said support structure and the glass lining guided by said guide rails;

drive means operatively connected to said cleaning carriage for driving the same along said guide rails;

a wiper blade mounted at said cleaning carriage; said wiper blade wiping the glass lining while said cleaning carriage is driven along said guide rails; and cleaning liquid distributing means for distributing a cleaning liquid over the glass lining.

* * * * *